Nov. 13, 1956    M. Y. SEATON ET AL    2,770,524
PRODUCTION OF PURE SODIUM CARBONATE FROM WYOMING TRONA
Filed Aug. 2, 1952    2 Sheets-Sheet 1
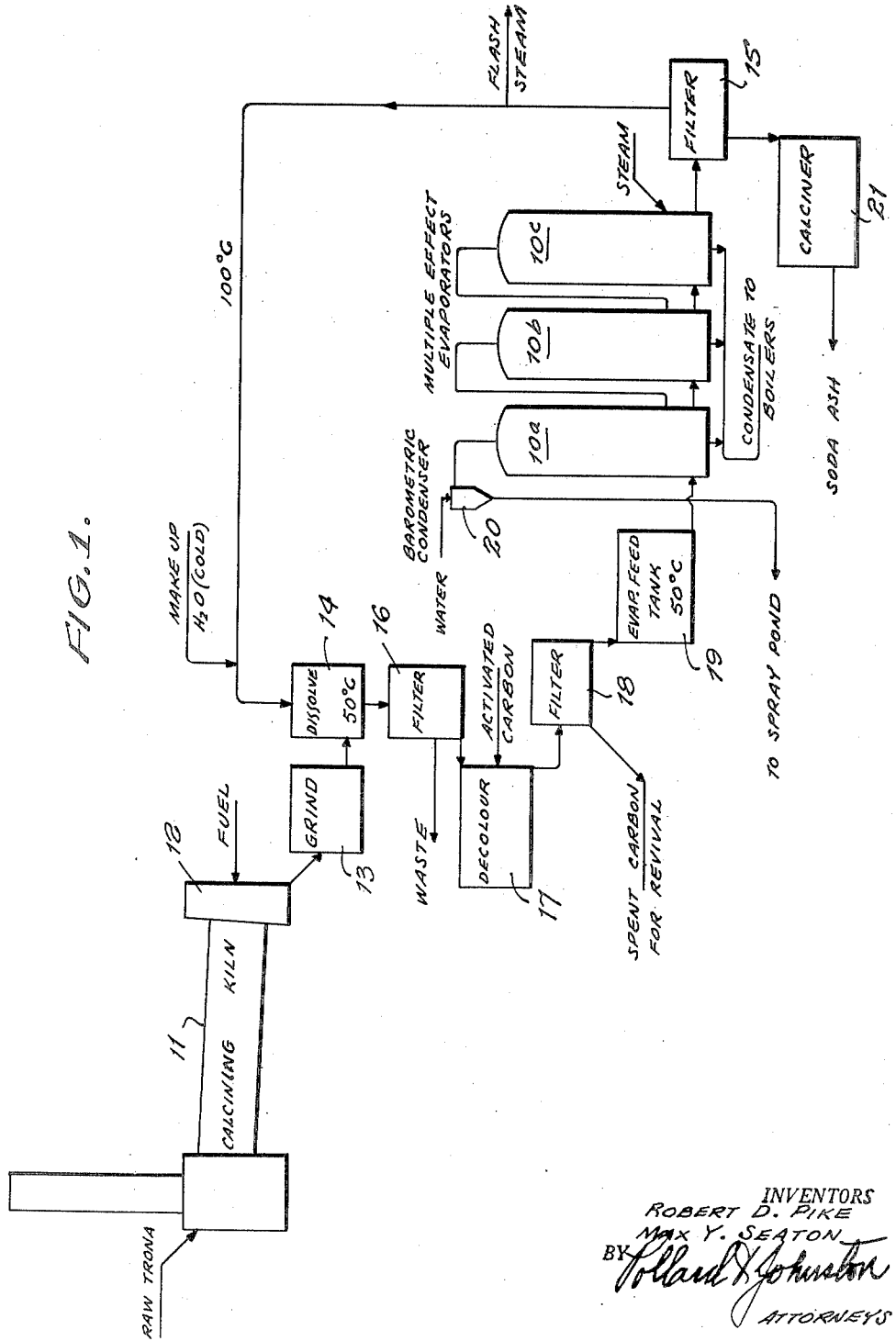
INVENTORS
ROBERT D. PIKE
MAX Y. SEATON
BY Pollard N. Johnston
ATTORNEYS

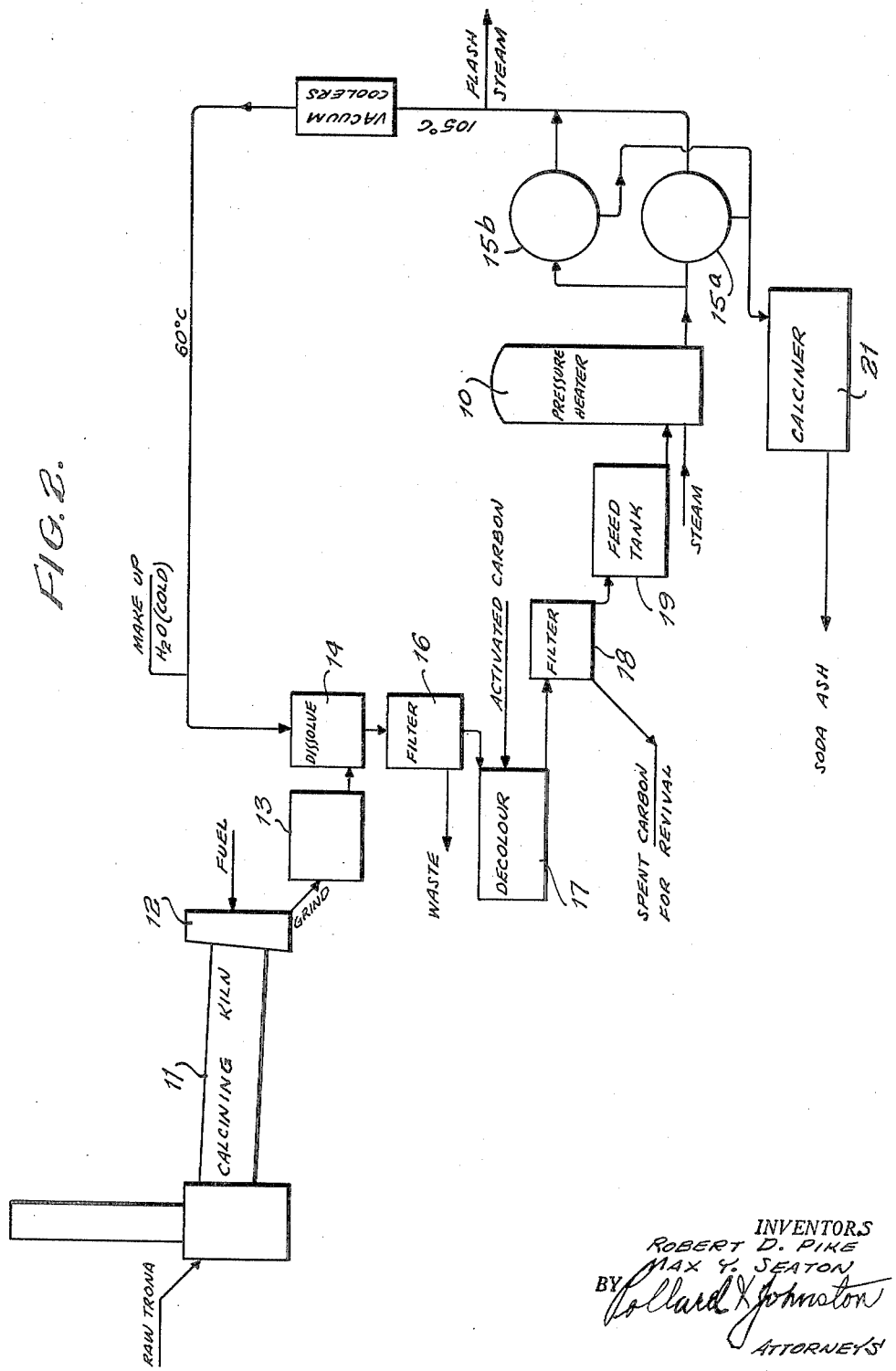

United States Patent Office 2,770,524
Patented Nov. 13, 1956

2,770,524

PRODUCTION OF PURE SODIUM CARBONATE FROM WYOMING TRONA

Max Y. Seaton and Robert D. Pike, Greenwich, Conn.; Kenneth B. Ray and The Stamford Trust Company, executors of said Robert D. Pike, deceased, said Seaton assignor to Food Machinery and Chemical Corporation, New York, N. Y., a corporation of Delaware Application August 2, 1951, Serial No. 239,926

8 Claims. (Cl. 23—63)

This invention relates to the production of dense soda ash from trona.

In Patent No. 2,346,140 there is described and claimed a method for first producing sodium sesquicarbonate from raw trona and then producing soda ash by calcination of the sodium sesquicarbonate. Soda ash which is produced in this manner by the direct calcination of sodium sesquicarbonate, while of very high purity, is of low bulk density and consists largely of acicular crystals. Its physical properties are different from ordinary light soda ash which is produced by the Solvay ammonia soda process by the calcination of sodium bicarbonate and its is more difficult to produce dense soda ash of conventional physical properties suitable for glass making from soda produced by the calcination of sodium sesquicarbonate by the processes of densification ordinarily employed.

It is the object of this invention to produce a dense soda ash of high purity and white color suitable for glass making as a product from the trona of the Green River, Wyoming, region.

Another object of this invention is to first calcine the Wyoming trona at such a temperature as to destroy at least the major part of the organic coloring matter which it contains, then dissolve the calcined trona in recycling brine, filter off the insoluble material and remove all remaining coloring matter by use of an adsorbent, such as activated carbon, thereby producing a water white solution, and then crystallize anhydrous sodium carbonate from the solution and calcine the anhydrous sodium carbonate to produce dense soda ash.

A further object of this invention is to produce crystals of anhydrous sodium carbonate which become dehydrated in whole or in part in contact with water by heating and evaporating at a temperature and corresponding pressure in excess of atmospheric, taking advantage of the inverse temperature solubility relationship of the system $$Na_2CO_3H_2O$$

to obtain high production of crystals which are in turn dried and calcined to produce a dense soda ash weighing not less than 55 lbs. per cubic foot and suitable for use in glass making.

Various other objects and advantages of our invention will appear as this proceeds.

Referring now to the drawings which illustrate two examples of how the invention may be practiced, Fig. 1 shows a diagrammatic outline of our process in which evaporation of water is mainly relied upon for the production of crystals of sodium carbonate.

Fig. 2 shows a diagrammatic outline of our process in which increase of pressure and temperature are mainly relied upon for the production of crystals of sodium carbonate.

In following out our process, as illustrated in Fig. 1, we rely mainly upon evaporation in multiple effect evaporators 10a, 10b, 10c to obtain the primary crystal product. The raw Wyoming trona is calcined in rotary kiln 11 which is preferably fired with sulphur-free gaseous fuel through burner 12 to produce a substantially completely calcined trona which is ground at 13, preferably to about —20 mesh, and is then dissolved at about 50° C. in a recirculating brine in dissolving system 14. The solvent is a recirculating brine which returns from the effect 10c of the multiple effect evaporators via filter 15 at about 100° C. and has cold make-up water added to it to reduce the temperature of the mixture to about 50° C. Auxiliary cooling means may be used if desired.

The solution of the calcined trona which is produced in dissolving system 14 is filtered at 16 and the waste filter cake containing the insoluble portion, after washing substantially free of soda values, is discarded. The pregnant solution is next treated with an adsorbent, preferably activated carbon, in mixer 17 and the water white solution is filtered free of solid carbon in filter 18. The latter carbon may be revived for reuse in any suitable manner, not shown, if desired. The clear water white solution then goes to evaporator feed tank 19 where it is stored at about 50° C. The first effect 10a of the multiple effect evaporators has its vapor chest directly connected to a barometric condenser 20 in which the condensing medium is water which is returned in circulation from spray pond, not shown. The fresh live steam for evaporation enters the last effect 10c and passes through the evaporators in countercurrent flow to the liquid.

Effect 10c is preferably operated so that a pressure of about 17.5 p. s. i. is carried in its vapor chest, giving a boiling point of about 110° C. to the solution, at which temperature the stable crystal phase is anhydrous sodium carbonate, $Na_2CO_3$. The liquid with its content of crystals flows to a pressure filter 15 of which at least two are preferably in service to permit of continuous operation. As the solution leaves the filter at 110° C., it will flash a minor amount of steam to a temperature of 100° C. which is about the atmospheric boiling point of the solution at Green River, Wyoming. This solution now has cold water added to it for make-up and is returned to the dissolver 14 where the temperature is held at about 50° C. and additional calcined trona dissolved therein.

We may, if desired, pass the recycling solution at 100° C. into a vacuum cooling system whereby its temperature may be conveniently reduced to 60° C.

The crystals in the filter 15, being in contact with the water, upon opening of the filter at about 100° C., will tend to hydrate to some extent to sodium carbonate monohydrate, $Na_2CO_3H_2O$. It is therefore desirable to discharge the filters as rapidly as possible once they are removed from the pressure line from the last effect 10c because the less hydration which occurs, the less fuel will be required in the calciner and dryer 21 and the denser the ash will tend to be.

From the filter 15 the crystals of substantially anhydrous sodium carbonate are transferred to the calciner 21. As no $CO_2$ is lost in calcination in 21, this calciner may be of any suitable type for drying the crystals and decomposing whatever $Na_2CO_3H_2O$ may have formed in the handling of the crystals.

A somewhat modified type of process similar to the process of Fig. 1 is illustrated in Fig. 2. The same reference numerals are used in Fig. 2 as in Fig. 1 except that in this modification of our process, a pressure heater 10 is substituted for the multiple effect evaporators 10a, 10b, 10c. No evaporation takes place in 10, but steam is supplied to the heating surfaces at sufficient temperature to impart a pressure to the solution on the other side of the surfaces within the heater 10 of about 30 atmospheres and at such pressure, in spite of the absence of evaporation, there is a prolific production of crystals of anhydrous $Na_2CO_3$ which are removed in the alternate pressure filters 15a, 15b. A substantial amount of steam is flashed from the effluent of these filters whereby the solution is cooled to about 100° C. and when cold make-up water is added prior to return to dissolving system 14, the temperature is again reduced to about 50° C. As before, we may interpose in the line of the circulating solution a vacuum cooling system to reduce the temperature from about 100° C. to 60° C. before adding the cold make-up water.

The crystals, as before, go to the calciner 21 where they are dried and any $Na_2CO_3H_2O$ which may be present is converted to $Na_2CO_3$, thus producing soda ash.

Soda ash weighing not less than 55 lbs. per cubic foot can be produced in this manner from Green River, Wyoming trona.

The examples which are given refer to the data of the system sodium carbonate, water, given in an article, "Thermochemistry of sodium carbonate and its solutions," by Kenneth A. Kobe and Thomas N. Sheeby, published in Industrial and Engineering Chemistry, vol. 40, No. 1, pages 99–102, January 1948. For the purpose of illustration, a part of Table 1 of this article is reproduced as Table 1 below.

TABLE 1

*Solubility of sodium carbonate in water*

| Temp., °C. | Water of Hydration | Grm. Moles/ 1,000 Grm. $H_2O$ | Grms. $Na_2CO_3$/ 100 Grms. $H_2O$ | $Na_2CO_3$, Per Cent | Vapor Pressure, Mm. Hg |
|---|---|---|---|---|---|
| 50 | 1 | 4.48 | 47.5 | 32.2 | 74.1 |
| 60 | 1 | 4.37 | 46.3 | 31.6 | 121.4 |
| 70 | 1 | 4.30 | 45.6 | 31.3 | 192.7 |
| 75 | 1 | 4.28 | 45.4 | 31.2 | 239.8 |
| 80 | 1 | 4.26 | 45.2 | 31.1 | 296.2 |
| 90 | 1 | 4.24 | 44.9 | 31.0 | 442.4 |
| 100 | 1 | 4.22 | 44.7 | 30.9 | 631.7 |
| 104.8 | 1 | 4.21 | 44.6 | 30.8 | 760.0 (atm.) |
| 109 | 1←→0 | 4.20 | 44.5 | 30.8 | 1.15 |
| 110 | 0 | 4.20 | 44.5 | 30.8 | 1.19 |
| 113 | 0 | 4.20 | 44.5 | 30.8 |  |
| 120 | 0 | 4.03 | 42.7 | 29.9 | 1.65 |
| 130 | 0 | 3.86 | 40.9 | 29.0 | 2.25 |
| 140 | 0 | 3.71 | 39.3 | 28.2 | 3.02 |
| 150 | 0 | 3.57 | 37.8 | 27.4 | 4.01 |
| 160 | 0 | 3.44 | 36.5 | 26.7 | 5.27 |
| 180 | 0 | 3.16 | 33.5 | 25.1 | 8.67 |
| 200 | 0 | 2.89 | 30.6 | 23.4 | 13.7 |
| 220 | 0 | 2.56 | 27.1 | 21.3 | 21.0 |
| 240 | 0 | 2.16 | 22.9 | 18.6 | 30.9 |

EXAMPLE 1

Raw trona is calcined in rotary kiln and discharged at a temperature in excess of about 500° C. The average content of water insoluble matter in the raw trona will be about 10%. After allowing for 10% loss in process, there is required about 1.51 lbs. raw trona to produce 1 lb. calcined trona. The calcined trona will contain about 13.7% of water insoluble material.

The $Na_2CO_3$ of the calcined trona is dissolved in water. There will be dissolved, according to Table 1, 47.5 lbs. $Na_2CO_3$ in 100 lbs. water at 50° C. and this is the net amount which must be recovered from the solution to keep the mother liquor circulation in balance.

The solution enters the first effect 10a of the evaporators at 50° C. with 47.5 lbs. $Na_2CO_3$ per 100 lbs. $H_2O$. While 47.5 lbs. $Na_2CO_3$ per 100 lbs. $H_2O$ going to the evaporators is the net production, as pointed out above, the total amount present is about twice that due to recirculation through the system. The solution leaves the last effect 10c with 44.5 lbs. $Na_2CO_3$ per 100 lbs. water and at a temperature of 110° C. corresponding to a pressure in the vapor chest of effect 10c of 17.5 p. s. i. The steam enters the steam chest of the last effect countercurrent to the flow of the liquid. Because of the inverse solubility relation of the system sodium carbonate, water, there is less solubility at the discharge temperature of 110° C. than there is at the entrance temperature of 50° C. On this account 3 lbs., or 6.32%, of the total $Na_2CO_3$ which is produced is crystallized without evaporation and this is actually increased to about 12.6% because there is present about twice as much $Na_2CO_3$ entering effect 10a as is produced in the evaporators because of the burden of recirculated $Na_2CO_3$ which is carried in the main solution stream through the process. The surplus $Na_2CO_3$ which is not crystallized in the evaporators is recirculated to the dissolving tank 14 where fresh cool water is added to dissolve at 50° C. the sodium carbonate coming into the cycle.

The condensate from the steam chest of the evaporators is cooled and used in the boilers, resulting in useful saving of heat.

EXAMPLE 2

Sodium carbonate, that is, calcined trona as in Example 1, after clarification and decolorization is dissolved in recirculating solution with added cold make-up water at 50° C. and the solution is passed into a pressure heating vessel where it is heated to 240° C. at a pressure of about 31 atmospheres (455 p. s. i.). As in Example 1, the feed entering the crystallization step holds in solution 47.5 lbs. $Na_2CO_3$ per 100 lbs. $H_2O$ but leaves the pressure heating vessel with about 23 lbs. $Na_2CO_3$ per 100 lbs. $H_2O$. The crystals are mainly produced as anhydrous $Na_2CO_3$ and pass into one of a battery of pressure filters. The liquid flowing out of the filters flashes to steam at about 105° C. This steam may be usefully employed in the plant. The remaining solution, after the steam flash, is preferably cooled to 60° C. in vacuum coolers of conventional type. Make-up water is then added and the solution again saturated with $Na_2CO_3$ at 50° C. and returned to the cycle via clarification and decolorization. All production of crystals is in the pressure heater without evaporation.

In the triple effect evaporators of Fig. 1 the steam passes countercurrent to the liquid and the solution boils in the last effect at a temperature slightly above atmospheric so as to initially produce in this effect anhydrous sodium carbonate. As the liquid proceeds through the first two effects in the series, the $Na_2CO_3$ will crystallize out as $Na_2CO_3H_2O$ but these crystals will tend to become dehydrated in the last effect where some anhydrous $Na_2CO_3$ is also produced initially. This supplies a different condition for crystallization in Examples 1 and 2 because in Example 2 most of the product is crystallized initially as anhydrous $Na_2CO_3$ because of the very rapid heating to about 109° C. which, as indicated in table I, is the temperature at which the production of anhydrous crystals begins.

While it is unnecessary for us to express a preference between the two cited examples of our process, we consider it desirable to point out that at the expense of some fuel and the use of high pressure in producing the crystals, we can, in Example 2, materially alter the conditions of crystallization.

Various other alterations and modifications of our invention may be made and different forms of apparatus may be used without departing from the spirit of our invention or the scope of the following claims.

We claim:

1. In a cyclic process for producing soda ash of high purity from Wyoming trona, the steps comprising calcining trona at a temperature in excess of 500° C., dissolving the calcined trona in water and recycled mother liquor at about 50° C., filtering and substantially removing all of the organic coloring matter by an adsorbent producing a water white solution, separating the latter solution from the adsorbent, flowing the solution through a plurality of heating and evaporating zones in countercurrent flow to the passage of steam therethrough to a final heating zone having a pressure in excess of atmospheric and a solution temperature substantially in excess of 100° C. at which anhydrous sodium carbonate is the stable crystal phase, separating the formed crystals from the mother liquor, adding make-up water sufficient to maintain a constant amount of water in the system, recycling the mother liquor and added make-up water to again dissolve calcined trona at a substantially lower temperature than prevails in said last zone, calcining and drying the crystals of sodium carbonate to produce soda ash.

2. In a cyclic process for producing soda ash of high purity from Wyoming trona, the steps comprising calcining trona at a temperature in excess of 500° C., dissolving the calcined trona in water and recycled mother liquor at about 50° C., filtering and substantially removing all of the organic coloring matter by an adsorbent producing a water white solution, separating the latter solution from the adsorbent, flowing the solution through a heating zone, heating and evaporating water from said solution while maintaining it under superatmospheric pressure and at a temperature substantially in excess of 100° C. at which anhydrous sodium carbonate is the stable external phase, thereby forming crystals of sodium carbonate, separating the formed crystals of sodium carbonate from the mother liquor, adding make-up water sufficient to maintain a constant amount of water in the system, recycling the mother liquor and added make-up water to again dissolve calcined trona at a substantially lower temperature than prevails in said zone, calcining and drying the crystals of sodium carbonate to produce soda ash suitable for use in glass making.

3. In a cyclic process for producing soda ash of high purity from Wyoming trona, the steps comprising calcining trona at a temperature in excess of 500° C. until the trona is substantially completely calcined, dissolving the calcined trona in water and recycled mother liquor at about 50° C., filtering and substantially removing all of the organic coloring matter by an adsorbent producing a water white solution, separating the latter solution from the adsorbent, flowing the solution through a plurality of heating and evaporating zones in countercurrent flow to the passage of steam therethrough to a final heating zone having a pressure in excess of atmospheric and a solution temperature substantially in excess of 100° C. at which anhydrous sodium carbonate is the stable crystal phase, said steam entering said final heating zone and passing successively through the remaining heating zones, separating the formed crystals from the mother liquor, adding make-up water sufficient to maintain a constant amount of water in the system, recycling the mother liquor and added make-up water to again dissolve calcined trona at a substantially lower temperature than prevails in said last zone, calcining and drying the crystals of sodium carbonate to produce soda ash.

4. In a cyclic process for producing soda ash of high purity from Wyoming trona, the steps comprising calcining trona at a temperature in excess of 500° C. until the trona is substantially completely calcined, dissolving the calcined trona in water and recycled mother liquor at about 50° C., filtering and substantially removing all of the organic coloring matter by an adsorbent producing a water white solution, separating the latter solution from the adsorbent, flowing the solution through a plurality of heating and evaporating zones in countercurrent flow to the passage of steam therethrough to a final heating zone having a pressure in excess of atmospheric and a solution temperature substantially in excess of 100° C. at which an anhydrous sodium carbonate is the stable crystal phase, the mother liquor carrying the crystals leaving and the steam entering the last zone, separating the formed crystals from the mother liquor, adding make-up water sufficient to maintain a constant amount of water in the system, recycling the mother liquor and added make-up water to again dissolve calcined trona at a substantially lower temperature than prevails in said last zone, calcining and drying the crystals of sodium carbonate to produce soda ash suitable for use in glass making.

5. In a cyclic process for producing soda ash of high purity from Wyoming trona, the steps comprising calcining trona at temperatures in excess of about 500° C. until the trona is substantially completely calcined, dissolving the calcined trona in water and recycled mother liquor at about 50° C., removing the water insoluble matter, flowing the solution through a plurality of heating and evaporating zones in countercurrent flow to the passage of steam therethrough to a final heating zone having a pressure in excess of atmospheric and a solution temperature substantially in excess of 100° C. at which anhydrous sodium carbonate is the stable crystal phase, the mother liquor carrying crystals of sodium carbonate leaving and the steam entering said last zone, separating the formed crystals from the mother liquor, adding make-up water sufficient to maintain a constant amount of water in the system, recycling the mother liquor and added make-up water to again dissolve calcined trona at a substantially lower temperature than prevails in said last zone, calcining and drying the crystals of sodium carbonate to produce soda ash.

6. In a cyclic process for producing soda ash of high purity from Wyoming trona, the steps comprising calcining trona at a temperature in excess of 500° C., dissolving the calcined trona in water and recycled mother liquor at about 50° C., removing water insoluble matter and substantially all of remaining coloring matter by an adsorbent producing a water white solution, separating the latter from the adsorbent and passing it to a pressure heating vessel maintained at a pressure in excess of 15 atmospheres and at a temperature substantially in excess of 100° C. at which sodium carbonate is the stable external phase by the injection of steam into a steam chest separated by suitable heating surfaces from the liquid whereby crystals of anhydrous sodium carbonate are produced without substantial evaporation because of the inverse temperature solubility relationship of the system, sodium carbonate, water, removing the formed crystals and flashing steam from the mother liquor thereby cooling it, adding cold make-up water sufficient to maintain a constant amount of water in the system and again dissolving calcined trona, and drying and calcining the crystals of sodium carbonate to produce soda ash.

7. In a cyclic process for producing soda ash of high purity from Wyoming trona, the steps comprising calcining trona at temperatures in excess of about 500° C., dissolving the calcined trona in water and recycled mother liquor at about 50° C., removing the water insoluble matter and passing the clarified solution to a pressure heating vessel maintained at a pressure in excess of 15 atmospheres and at a temperature substantially in excess of 100° C. at which sodium carbonate is the stable external phase by the injection of steam into a steam chest separated by suitable heating surfaces from the liquid whereby crystals of anhydrous sodium carbonate are produced without substantial evaporation because of the inverse temperature solubility relationship of the system, sodium carbonate, water, removing the formed crystals while the solution is under pressure and flashing steam from the mother liquor thereby cooling it, adding cold make-up water sufficient to maintain a constant amount of water in the system and again dissolving calcined trona, and drying and calcining the crystals of sodium carbonate to produce soda ash.

8. The method of producing dense soda ash from Wyoming trona which comprises calcining the trona at temperatures in excess of about 500° C. until the trona is substantially completely calcined, dissolving the calcined trona in a recycled mother liquor at a temperature of the order of 50° C., removing water insoluble impurities from the dissolved trona and heating the trona solution under pressure in excess of atmospheric pressure and at a temperature substantially in excess of 100° C. to form anhydrous sodium carbonate crystals therein, separating the formed crystals from the mother liquor, recirculating the mother liquor, adding make-up water thereto sufficient to maintain a constant amount of water in the system and dissolving more calcined trona therein at a temperature of the order of 50° C., and calcining the sodium carbonate crystals to form dense soda ash therefrom.

References Cited in the file of this patent

UNITED STATES PATENTS

| | | |
|---|---|---|
| 2,267,136 | Robertson | Dec. 23, 1941 |
| 2,346,140 | Pike | Apr. 11, 1944 |
| 2,448,191 | Pike | Aug. 31, 1948 |
| 2,455,190 | Pike | Nov. 30, 1948 |